US005579000A

United States Patent [19]

Mulqueen

[11] Patent Number: 5,579,000

[45] Date of Patent: Nov. 26, 1996

[54] AUDIO/VIDEO PRICE CONFIRMATION SYSTEM

[76] Inventor: Dennis E. Mulqueen, 3743 Dunmore NW., Canton, Ohio 44708

[21] Appl. No.: 516,977

[22] Filed: Aug. 18, 1995

Related U.S. Application Data

[63] Continuation of Ser. No. 188,597, Jan. 26, 1994, abandoned, which is a continuation of Ser. No. 41,526, Apr. 1, 1993, abandoned, which is a continuation of Ser. No. 896,458, May 26, 1992, abandoned, which is a continuation of Ser. No. 302,781, Jan. 30, 1989, abandoned.

[51] Int. Cl.[6] .......... H04Q 1/00

[52] U.S. Cl. .......... 340/825.3; 340/825.35; 340/286.06; 348/150; 348/148; 348/14

[58] Field of Search .......... 340/825.3, 825.35, 340/825.34, 825.06, 286.06; 364/401, 403, 404, 405; 235/378; 382/100, 143; 186/52, 59; 348/61, 135, 136, 137, 143, 150, 14; 345/2; 356/396; H04N 7/18

[56] References Cited

U.S. PATENT DOCUMENTS

| | | | |
|---|---|---|---|
| 3,863,245 | 1/1975 | Swinamer et al. | 340/286.06 |
| 3,935,380 | 1/1976 | Coutta | 358/108 |
| 4,120,004 | 10/1978 | Coutta | 358/108 |
| 4,225,881 | 9/1980 | Tovi | 358/108 |
| 4,511,886 | 4/1985 | Rodriguez | 358/108 |
| 4,745,472 | 5/1988 | Hayes | 358/107 |

FOREIGN PATENT DOCUMENTS

| | | | |
|---|---|---|---|
| 2140650 | 11/1984 | United Kingdom | 364/405 |

*Primary Examiner*—Michael Horabik
*Assistant Examiner*—Edwin C. Holloway, III
*Attorney, Agent, or Firm*—Renner, Kenner, Greive, Bobak, Taylor & Weber

[57] ABSTRACT

An audio/video price confirmation system is disclosed for implementation in retail department stores and the like. A display is maintained in close proximity to the checkout stations of the store. The display area includes a vidicon which is maintained above a dimensionalized grid upon which unpriced items may be placed. Also at the display area is an audio intercom. The intercom and vidicon communicate with remote stations throughout the department store, typically one such station in each department. A cashier may then place an unpriced item on the grid, transmit its image to the appropriate department, and communicate with personnel in that department to ascertain the price of the item.

6 Claims, 1 Drawing Sheet

AUDIO/VIDEO PRICE CONFIRMATION SYSTEM

This is a continuation prior application Ser. No. 08/188,597, filed Jan. 26, 1994, which is a continuation of prior application Ser. No. 08/041,526, filed Apr. 1, 1993, which is a continuation of prior application Ser. No. 07/896,458, filed May 26, 1992, which is a continuation of prior application Ser. No. 07/302,781, filed Jan. 30, 1989, all of which are now abandoned.

TECHNICAL FIELD

The invention herein resides in the art of audio/video systems and, more particularly, to such a system as may be employed in retail sales establishments to facilitate the determination of pricing of various items. Specifically, the invention relates to a centralized display area having audio/video communications with remote areas throughout the sales establishment, allowing for ease of communication between the two.

BACKGROUND ART

Anyone who has shopped at a supermarket or department store has been confronted with the situation in which the cashier at the checkout area is unable to determine the price of an item to be purchased. The cashier is then required to page a clerk or manager from the department in the store from which the item originated, requesting the presence of that individual at the checkout station. Occasionally, the clerk or manager, upon reaching the checkout station and seeing the product, is able to advise the cashier as to the price. However, the problem becomes aggravated on occasion when the clerk or manager does not know the price, but must return to his department to make that determination. The individual must then again return to the checkout counter to apprise the cashier of the price. In the most automated of stores, once the clerk or manager has returned to his department to determine the price, he may use an intercom, paging system, or telephone to advise the cashier of the same.

In any of the events described above, there is a significant cost of time, money, and customer aggravation over the process. Such a process is inefficient, requiring the employment of additional personnel, increasing the overhead of the retail facility. More importantly, however, such process is time consuming and aggravating to the customer who, experiencing this on several occasions, may determine not to shop at the store.

It is apparent that there is a need in retail establishments for a more automated means for making "price checks" at the cashier or checkout station. Such a system is necessary for the benefit of both the retailer and the consumer.

DISCLOSURE OF INVENTION

In light of the foregoing, it is a first aspect of the invention to present an audio/video price confirmation system which eliminates the need for travel of department personnel to the checkout stations.

Another aspect of the invention is the provision of an audio/video price confirmation system which reduces the time and cost of "price checks."

Still a further aspect of the invention is the provision of an audio/video price confirmation system which allows audio and video communications between the checkout personnel and the personnel of the various departments within the retail establishment.

Yet an additional aspect of the invention is the provision of an audio/video price confirmation system which is cost effective, easy to implement in existing establishments, and capable of being deployed by use of state of the art equipment.

The foregoing and other aspects of the invention which will become apparent as the detailed description proceeds are achieved by an audio/video price confirmation system for implementation in a retail establishment, comprising: a checkout station for consummating sales, totalling prices, and exchanging goods for payment; a display area in close proximity to said checkout station, said display area comprising means for generating a video image; and a remote station, displaced from said checkout station and display area, said remote station being in communication with said display area and comprising means for receiving said video image.

Yet other aspects of the invention are attained by an audio/video price confirmation system for implementation in a retail establishment, comprising: a checkout station for exchanging goods for payment; a display area in close proximity to said checkout station, said display area comprising a vidicon for generating a video image of an article placed upon a grid within said display; and a remote station, displaced from said checkout station and display area, said remote station having a first video screen in communication with said vidicon for receiving and displaying said video images.

DESCRIPTION OF DRAWING

For a complete understanding of the objects, techniques and structure of the invention, reference should be had to the following detailed description and accompanying drawing wherein.

BEST MODE FOR CARRYING OUT THE INVENTION

Figure 1:
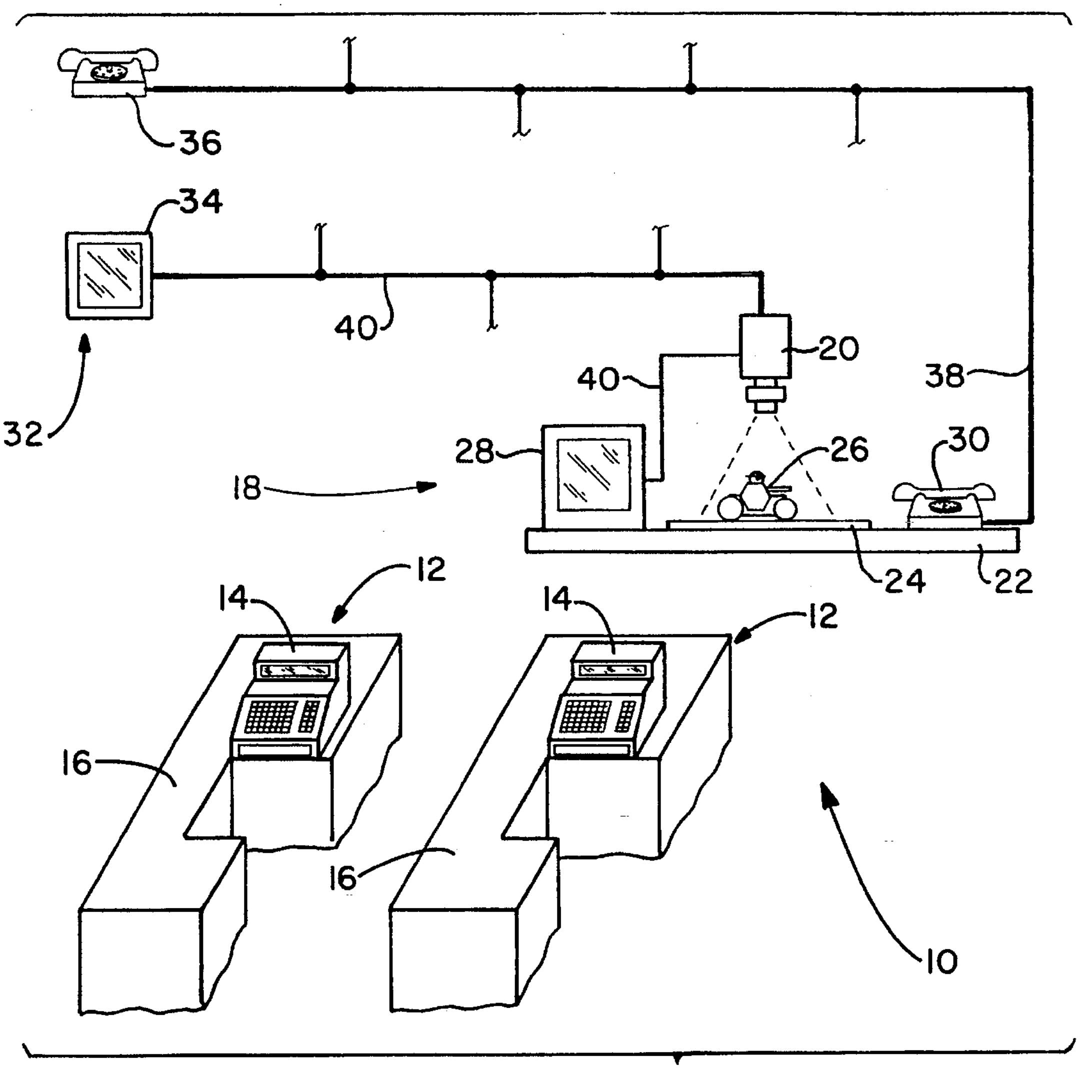
FIG. 1 is an illustrative view of the audio/video price confirmation system of the invention.

Referring now to the drawing and more particularly FIG. 1, it can be seen that an audio/video price confirmation system according to the invention is designated generally by the numeral 10. Such a system would typically be placed in the environment of a retail facility such as a grocery store or department store, but the utilization of the same is equally advantageous in smaller facilities. In any such facility, one or more checkout stations 12 would typically be present, each of the same including a cash register 14 and a checkout counter 16. In standard fashion, a customer, having selected goods from various departments within the store, will bring them to the one of the checkout stations 12 where a cashier will total the prices of the items to be purchased and the sale will be consummated by the exchange of payment for the goods.

According to the invention, a display area 18 is positioned in close proximity to the checkout stations 12. In the event that only a single checkout station is employed in the establishment, a display area 18 may be positioned at the checkout station. However, where a plurality of such stations are employed, a single display area 18 may be centrally located with respect thereto, and preferably within 5–50 feet of each of the checkout stations 12.

As shown, the display area 18 includes a video camera 20 such as a vidicon, which is positioned above a table or support surface 22. Preferably, the vidicon 20 will include a "zoom" or adjustable telescopic lens such that the field of view may be adjusted and the size of the items being viewed may be increased or decreased.

Maintained upon the surface 22 is a grid 24 which is positioned directly beneath the vidicon 20 and within its field of view. An article or item which is desired to be purchased, but the price of which is unknown to the cashier, may be placed upon the grid 24 and within the field of view of the vidicon 20. A cathode ray tube (CRT) or appropriate video display screen 28 is also maintained on the surface 22 and is interconnected with the vidicon 20 to display on the screen the field of view of the camera. Finally, a telephone, intercom, or other appropriate audio signal transmitting device is also maintained at the display area 18, as shown.

It will further be seen from FIG. 1 that a plurality of remote stations 32, only one being shown in the drawing, are positioned throughout the store in the various departments. Each of the remote stations 32 includes a CRT or appropriate video display screen 34 and a telephone or intercom device 36. As shown, the intercom at the remote station is interconnected with the intercom at the display area 18 by means of a line 38, which also services the intercom 36 at various other remote stations 32 positioned in the various departments throughout the store. In like manner, the line 40 interconnects the vidicon 20 with the screen 34 at each of the various remote stations 32 in the various departments throughout the store. It will also be noted that the line 40 interconnects the vidicon 20 with the display screen 28 such that the display screen 28, as well as the screens 34, all display the field of view of the vidicon 20.

From the foregoing, it will be appreciated that audio and video communications may now be had from the display area 18 to each of a plurality of remote stations 32 by means of the vidicon 20, display screen 28, intercom 30,36,38, and remote screens 34. A cashier at the display area 18, as well as a clerk or department manager at a remote area 32, may thus verbally communicate with each other through the intercom system, while viewing the same item over the display screen.

Figure 2:
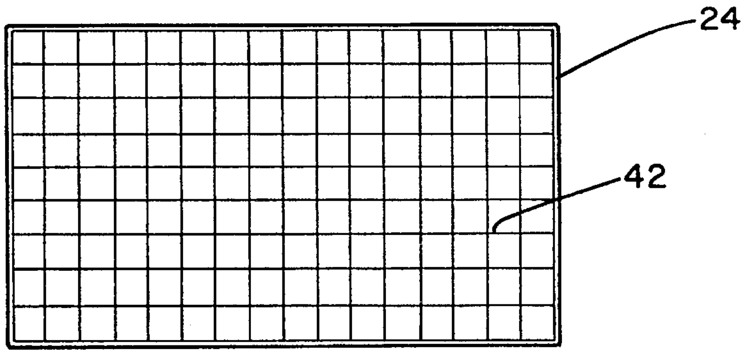
FIG. 2 is a top plan view of the dimension grid employed in the system of FIG. 1.

With reference now to FIG. 2, it can be seen that the grid 24 is preferably a cross-hatched pattern 42, with the cross hatches scaled appropriately such that the size of the item 26 placed thereon can be readily perceived. In preferred embodiments of the invention, the grid 24 will comprise a pattern having cross-hatching of ½"–5" dimensions, depending upon the types of articles sold at the retail establishment. Size designations may be imprinted directly on the grid 24.

In use, a cashier at a checkout station 12, confronted with an article of unknown price, simply accesses the display area 18 and places the item on the grid 24. The "zoom" or telescopic lens of the vidicon 20 is then adjusted such that the display screen 28 adequately shows the item on the cross hatch pattern 42 such that its nature and size can be determined. Communication is then made with a clerk or manager in the appropriate department by means of the intercom 30,36,38. The clerk or manager in the department views the article on the screen 34 at the remote station 32 and, if the price is not readily known to the clerk or manager, he can access the display area of that product to make the price determination and communicate the same to the cashier. Of course, if necessary, the orientation of the item 26 may be changed to suit the needs of the department clerk or manager, as by laying the item 26 on its side, top, back, or the like as requested through the intercom. It is also preferred that the vidicon 20 be able to transmit, and the display screens 28,34 be able to receive and display, color images. This is desirable since color may often assist in the identification and pricing of the items 26.

It will be readily perceived by those skilled in the art that the concept of the invention may be employed in embodiments different from those presented in the preferred embodiment above. Indeed, appropriate radio frequency signals or video signals may be transferred through the air, without wires and by means of transmitting and receiving antennas, for the intercom system and the video portion of the system. The method by which the audio and video signals are transmitted from the display area 18 to the remote stations 32 may vary within the context of the invention.

Thus it can be seen that the objects of the invention have been satisfied by the structure presented hereinabove. While in accordance with the patent statutes, only the best mode and preferred embodiment of the invention has been presented and described in detail, it will be understood that the invention is not limited thereto or thereby. Accordingly, for an appreciation of the true scope and breadth of the invention, reference should be had to following claims.

What is claimed is:

1. A price confirmation system in a retail establishment providing video and audio communication links, comprising:

at least one checkout station having a cash register and a checkout counter;

a display area in close proximity to said checkout station, but excluding said checkout station therefrom, said display area comprising:

a cross-hatched grid having a pattern of cross-hatching between one-half inch and five inches, said cross-hatched grid receiving thereon an article of unknown price, said cross-hatched grid maintained on a support surface;

a video camera positioned above said cross-hatched grid for viewing just the article of unknown price and said cross-hatched grid and generating a color video image of the article disposed on said cross hatched grid, said video camera adjustable to properly show the nature and size of the article to be priced;

a video display screen for displaying said video color image of the article disposed on said cross-hatched grid;

a video communication link interconnecting said video camera to said video display screen and an audio transceiving device; and a plurality of remote stations displaced from said checkout station and said display area, each of said plurality of remote stations comprising:

a remote video display screen connected to said video communication link for receiving and displaying said color video image of the article disposed on said cross-hatched grid; and a remote audio transceiving device interconnected by an audio communication link to said audio transceiving device;

wherein both said remote video display screen and said remote audio transceiving device allow an individual at one of said plurality of remote stations to communicate with an individual at said display area for the purpose of confirming a price of the article which is then entered at said cash register.

2. The price confirmation system according to claim 1, wherein said display area is within five to fifty feet of said checkout station.

3. The price confirmation system according to claim 1, wherein said video display screen and said audio transceiving device are maintained on said support surface.

4. A method for confirming a price in a retail establishment comprising the steps of:

providing at least one checkout station having a checkout counter and a cash register operated by a cashier;

accessing a display area by the cashier with an article of unknown price, said display areas comprising;

a support surface on which is maintained a cross-hatched grid having a pattern of cross-hatching between one-half inch and five inches;

a video camera positioned above said cross-hatched grid, said video camera generating a color video image;

a video display screen for receiving and displaying said color video image;

a video communication link interconnecting said video camera to said video display screen; and an audio transceiving device;

placing the article of unknown price on said cross-hatched grid;

viewing with said video camera just said article of unknown price and said cross-hatched grid, said color video image displayed on said video display screen;

transmitting said color video image to one of a plurality of remote stations, said remote station accessible by a clerk, said remote station having a remote video display screen connected to said video communication link for displaying said color video image, and a remote audio transceiving device interconnected by an audio communication link to said audio transceiving device;

viewing said remote video display screen by the clerk;

communicating with said audio transceiving device and said remote audio transceiving device between the cashier and the clerk, respectively, the cashier and the clerk confirming the price of the article; and entering the price into said cash register by the cashier.

5. The method according to claim 4, further comprising the step of providing said display area within five to fifty feet of said checkout station.

6. The method according to claim 4, further comprising the step of repositioning the article on said cross-hatched grid so the clerk can make an accurate determination as to the size and nature of the article.

* * * * *